(12) United States Patent
Matsuo

(10) Patent No.: US 8,469,581 B2
(45) Date of Patent: Jun. 25, 2013

(54) BACKLIGHT UNIT

(75) Inventor: Takashi Matsuo, Tokushima (JP)

(73) Assignee: Nichia Corporation, Anan-shi (JP)

( * ) Notice: Subject to any disclaimer, the term of this patent is extended or adjusted under 35 U.S.C. 154(b) by 200 days.

(21) Appl. No.: 12/369,535

(22) Filed: Feb. 11, 2009

(65) Prior Publication Data

US 2009/0201667 A1 Aug. 13, 2009

(30) Foreign Application Priority Data

Feb. 12, 2008 (JP) ................................ P2008-030092

(51) Int. Cl.
*F21V 7/04* (2006.01)

(52) U.S. Cl.
USPC .................. 362/633; 349/61; 349/62; 349/65

(58) Field of Classification Search
USPC ....................................... 362/633; 349/58–71
See application file for complete search history.

(56) References Cited

U.S. PATENT DOCUMENTS

| 6,504,587 | B1 | 1/2003 | Morishita et al. | |
| 6,854,856 | B2 * | 2/2005 | Shin et al. | 362/613 |
| 2001/0006459 | A1 * | 7/2001 | Okumura | 362/31 |
| 2003/0223215 | A1 | 12/2003 | Shin et al. | |
| 2004/0109104 | A1 * | 6/2004 | Lee | 349/58 |

FOREIGN PATENT DOCUMENTS

| JP | 2000-75273 A | 3/2000 |
| JP | 2003-57646 A | 2/2003 |
| JP | 2003-346533 A | 12/2003 |
| JP | 2007-206115 A | 8/2007 |
| JP | 2008-9138 A | 1/2008 |

OTHER PUBLICATIONS

Japanese Office Action issued Feb. 2, 2010, in corresponding Japanese Application 2008-030092.

* cited by examiner

*Primary Examiner* — Sean Gramling
(74) *Attorney, Agent, or Firm* — Birch, Stewart, Kolasch & Birch, LLP

(57) ABSTRACT

To provide a backlight having a positioning member that can prevent from coming off from metal frame and damaging a display panel even when used in a harsh environment such as undergoing sharp temperature changes.

A backlight unit comprises a light guiding module having a light source and a light guide plate; a resin frame having a recess formed by side walls and bottom surface thereof, and housing the light guiding module; and a metal frame fitted with the resin frame, having an opening in an upper surface thereof and the opening being located above the recess of the resin frame, and allowing to pass light from the light guiding module therethrough. The resin frame has a protrusion on the top surface of one of the side walls of the recess. The metal frame has a notch on the upper surface thereof so that the protrusion passes therethrough. The opening allows the light from the light guiding module to pass therethrough.

4 Claims, 3 Drawing Sheets

(a)

(b)

BACKLIGHT UNIT

BACKGROUND OF THE INVENTION

1. Field of the Invention

The present invention relates to a backlight unit to be disposed on the back of a liquid display panel or the like.

2. Description of the Related Art

A backlight unit comprises a light guiding module ("flight guiding module" is also called "backlight") and a resin flame which houses the backlight. The backlight unit is disposed on the back of a display panel, such as liquid crystal display, so that the light from the light guiding module is provided to a display area of the display panel.

Japanese patent publication JP2000-75273A discloses a backlight unit comprising a metal frame provided on a display panel side of a resin frame, for the purpose of increasing the strength of the resin frame. The metal frame is formed substantially in a box shape. The upper flat surface (or plane) of the metal frame has an opening formed in an portion corresponding to a display area of the display panel so that light from a light guiding module can pass therethrough.

By fitting the resin frame and the metal frame with each other, a structure having high strength against twisting around diagonal is achieved In addition, display panel positioning spacers formed from a resin are provided on corners of the metal frame, which makes it possible to align the display panel and the metal frame.

In case the positioning spacers formed from resin are provided on the metal frame, however, the positioning spacers may come off from the metal frame during use in an environment that undergoes sharp temperature changes, due to impact and/or the difference in thermal expansion coefficient between different materials.

In case positioning spacers formed from a metal are provided on the metal frame, on the other hand, the display panel may be damaged (e.g. scratched) by the positioning spacers formed from metal during manufacture and use, because metal is tend to be stiffer than the material used in the display panel.

The present invention provides a backlight unit that can maintain high reliability, such as avoiding coming off a spacer and damaging a display panel by a spacer, even when used in a harsh environment such as undergoing sharp temperature changes.

SUMMARY OF THE INVENTION

In order to achieve the object described above, a backlight unit of the present invention comprises a light guiding module having a light source and a light guide plate; a resin frame having a recess formed by side walls and bottom surface thereof, and housing the light guiding module; and a metal frame fitted with the resin frame, having an opening in an upper surface thereof and the opening being located above the recess of the resin frame, and allowing to pass light from the light guiding module therethrough, wherein the resin frame has a protrusion on the top surface of one of the side walls of the recess, the metal frame has a notch on the upper surface thereof so that the protrusion passes therethrough, and the opening allows the light from the light guiding module to pass therethrough.

In an embodiment of the present invention, the resin frame has a second protrusion on the top surface of another side wall extending in different direction from that of said one of side walls and the metal frame has a second notch so that the second protrusion passes therethrough.

In another embodiment of the present invention, the opening has substantially rectangular shape, the resin frame has four second protrusions on top surfaces of side walls thereof, each of the four protrusions is adjacent to a different corner of the resin frame and has a portion disposed outside of an extension of the shorter side that constitutes the opening in upper surface of the metal frame, and the metal has four second notches so that the four second protrusion passes therethrough.

It is preferable that the opening has rounded corners of radius of curvature in a range from 0.3 to 2.3 mm.

The present invention can provide a backlight unit that is capable of maintaining high reliability (e.g. avoiding coming off a positioning member and damaging a display panel by a spacer) even when used in a harsh environment.

DESCRIPTION OF THE PREFERRED EMBODIMENTS

Embodiments of the light emitting apparatus of the present invention will now be described in detail.

First Embodiment

Figure 1:
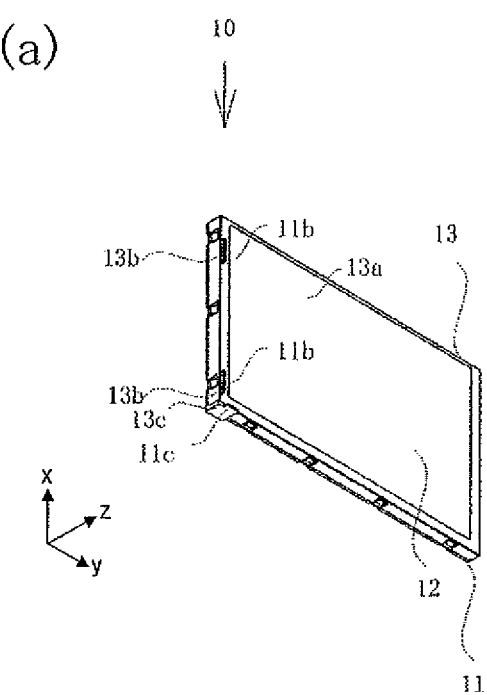
FIG. 1(*a*) is a schematic perspective view of the backlight unit according to one embodiment of the present invention, and FIG. 1(*b*) is a schematic exploded perspective view of the backlight unit shown in FIG. 1(*a*).
Figure 1:
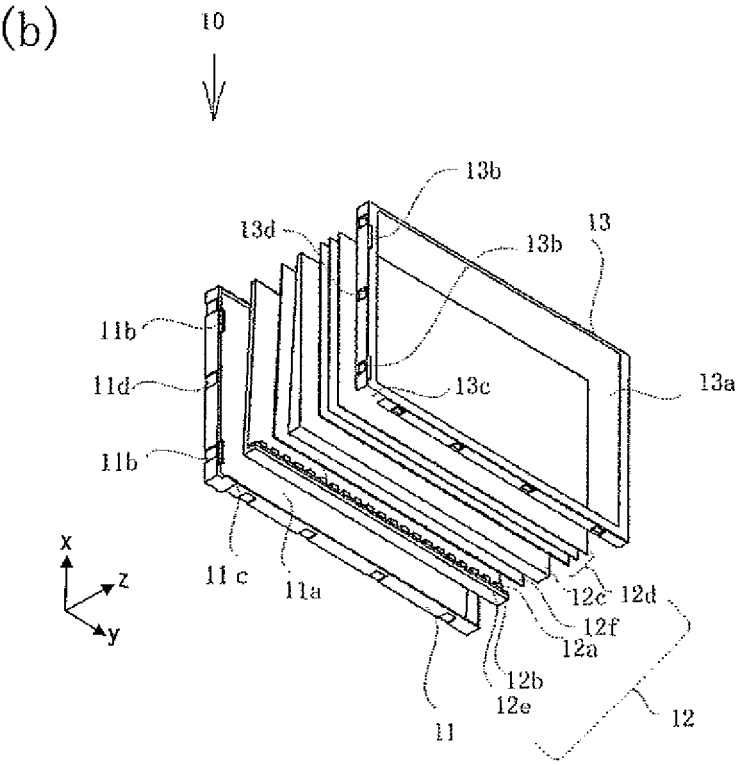

FIG. 1(*a*) shows in a schematic perspective view of a backlight unit 10 according to the first embodiment of the invention viewed from the side of the flat surface thereof. FIG. 1(*b*) shows a schematic exploded perspective view of backlight unit 10 viewed from the side of the flat surface thereof. The backlight unit 10 comprises a resin frame 11, a light guiding module (also called a "backlight") 12 and a metal frame 13. Specifically, the backlight unit 10 comprises the light guiding module 12, the resin frame 11 that has a recess 11*a* where the light guiding module 12 is housed, and the metal frame 13, which is fitted with the resin frame 11, having an opening (or window) 13*a* that covers the recess 11*a* of the resin frame 11 (i.e. the opening 13*a* is arranged on or above the recess 11*a*) and allows to the light from the light guiding module 12 to pass therethrough. The opening 13*a* is disposed on upper surface of the metal frame 13.

The resin frame 11 has protrusions 11*b* on a flat surface of the periphery of the recess 11*a* (i.e. the protrusions 11*b* are disposed on the top surface of a side wall of the resin flame 11 as described detail below). The resin frame 11 preferably has protrusion 11*c* on another flat surface of the periphery of the recess 11*a* (i.e. the protrusion 11*c* may be disposed on the top surface of another side wall of the resin flame 11) as shown in FIGS. 1(*a*) and 1(*b*). The metal frame 13 has notches 13*b* in the periphery flat surface of the opening 13*a* (i.e. in the upper surface of the metal frame 13 as descried detail below) where the protrusions 11*b* can pass through. In case the protrusion 11*c* is disposed, as shown in FIGS. 1(*a*) and 1(*b*), the metal frame 13 has a notch 13*c* in a side wall of the metal frame 13 where the protrusion 11*c* can pass through.

The details of the resin frame 11, the light guiding module 12 and the metal frame 13 are described as below.

Resin Frame 11

The resin frame 11 of the first embodiment has the recess 11a constituted from a bottom surface (i.e. bottom plate) of substantially rectangular shape and side faces (i.e. four side walls) surrounding the bottom surface. The resin frame 11a has the protrusions 11b that protrude upwardly (i.e. parallel to the z axis direction in FIGS. 1(a) and 1(b)) from the flat top surface of one of the side walls (periphery walls) of the recess 11a and are molded integrally with the side wall. The resin frame 11 preferably has the protrusions 11c that protrude upwardly (i.e. parallel to the z axis direction in FIGS. 1(a) and 1(b)) from the flat top surface of another side walls of which extending direction is different form the that of the side wall on which protrusions 11b are formed. The protrusion 11c is also molded integrally with the side wall of recess 11a. For the material to form the resin frame 11, resins that include various light dispersants may be preferably used. Size and shape of the resin frame 11 may be selected in accordance to the size and shape of the light guiding module 12 to be housed therein. For the material to form the resin frame 11 it is preferable to use a resin that has high impact resistance and weatherability, particularly it is preferable to use polycarbonate resin.

The protrusions 11b, 11c of the resin frame 11 pass through the notches 13b, 13c metal frame 13, respectively and protrude from the metal frame 13 upwardly, thereby the protrusions 11b, 11c play the role of, positioning of the display panel to be disposed on the upper flat surface side of the metal frame 13 by contacting with the display panel, in addition to alignment with the metal frame 13 by fitting with the notches 13b, 13c. The protrusions 11b, 11c with frame 11 can be prevented from the problems of coming off from metal frame 13 and damaging a display panel, which may be raised in conventional spacers as aforementioned, because protrusions 11b, 11c are made of resin and strongly bonded with the resin frame 11 by forming integrally with resin frame 11. Furthermore, forming the positioning members, such as protrusions 11b, 11c, integrally with the resin frame 11 improves the positioning accuracy and enables it to reduce the number of components.

In the embodiment shown in FIGS. 1(a) and (b), the protrusions 11b are provided at two positions on the top face of the side wall of the resin frame 11 (i.e. on the flat surface of a periphery) in the direction of shorter side of the recess 11a (i.e. the side wall extending in direction of the y axis in FIG. 1(b)). The number of the protrusions 11b may be one, however two or more is preferable. The protrusion 11c may be provided at one position on the top face of the side wall side wall of the resin frame 11 in the direction of longer side of the recess 11a (i.e. the side wall extending in direction of the y axis in FIG. 1(b)), and the protrusion 11c also protrudes outwardly (i.e. in the –x direction in FIG. 1(b)) from the outer surface (i.e. y-z plane) of the side wall. The protrusions 11b define the position of the display panel in the y axis direction of FIG. 1(b) and The protrusions 11c defines the position of the display panel in the x axis direction of FIG. 1(b).

Therefore, this arrangement of the protrusions 11b, 11c results in the regulating the position of the display panel in two different directions on the upper surface of metal frame 13 where the display panel can slid two dimensionally, thereby the display panel can be disposed exactly in a desired position.

The protrusion 11c is more preferably formed on the top surface of the side walls of the recess 11a which side wall adjoin to the side wall on which the protrusions 11b is formed, as shown in FIGS. 1(a) and 1(b) In this more preferred embodiment the protrusions 11b and the protrusion 11c are aligned in L letter shape thereby it become easier to adjust the position of the display panel. As aforementioned, these protrusions 11b, 11c protrude from the corresponding notches 13b, 13c of the metal frame 13. It is preferable that the resin frame 11 has, on the bottom plate thereof, a hole (not shown) for the purpose of improving the dissipation of heat from the light guiding module 12 dispose therein.

Light Guiding Module 12

The light guiding module 12 of this embodiment, housed in the recess 11a of the resin frame 11, comprises light sources 12a and a light guide plate 12c that has a light receiving side face opposing the light sources 12a and lets the light from the light source 12a emerge from the flat surface. In a preferred embodiment, the light guiding module 12 further comprises a mounting board 12b whereon the light sources 12a are mounted and an optical sheet 12d laminated on the light guide plate 12c for optically controlling the light emerging from the light guide plate 12c. In this embodiment, a metal plate 12e that is bent in L-letter shape may be disposed along the bottom surface and the side wall of the resin frame 11, while a light reflecting sheet 12f, the light guide plate 12c and the optical sheet 12d are formed successively on the flat surface of the metal plate 12e, while the mounting board 12b whereon the light sources 12a are mounted is disposed on the inside of the side face of the metal plate 12e. Constitution of the backlight of the present invention is not restricted to that described above, and various conventional light guiding modules (i.e. backlights) that have been used may be employed.

The light source 12a of this embodiment refers to a light emitting member that is capable of introducing light into the light guide plate, including a semiconductor light emitting element such as light emitting diode and semiconductor laser, cold cathode tube or various combinations thereof. With regard to the relative arrangement between the light source 12a and light guide plate 12c, this embodiment employs edge-light type where the light source 12a are opposing to the end face of the light guide plate 12c, although the present invention is not limited to this constitution, and direct type (or direct light type) where the light source 12a are opposing to the bottom surface of the light guide plate 12c may also be employed.

The mounting board 12b may be provided for the purpose of mounting the light sources and fastening them thereon, and has a wiring formed from a conductor for supplying power to the light sources 12a. The mounting board 12b may preferably be constituted from a glass epoxy substrate, a flexible substrate or a metal member bonded by an insulating resin with electrically conductive pattern formed thereon from copper foil or the like. Alternatively, a board having high heat dissipating property may be formed with wiring formed via an insulating material on a metallic material such as aluminum or copper. The mounting board 12b is preferably disposed in close contact with a chassis such as metal plate 12e via a member having high heat conductivity such as heat dissipating sheet.

The light guide plate 12c is a translucent member that is capable of guiding the light, that has been emitted by the light source 12a and entered through a part of one end face thereof, by making use of reflection inside thereof and emitting the light in a desired configuration through a predetermined light emitting surface. Therefore, the light guide plate 12c may have various shapes such as pointer of a meter or a plate that can be used as liquid crystal backlight in accordance to the desired shape of the light emitting surface. The light guide plate 12c has translucency in order to emit the light from the light source 12a efficiently through the light emitting surface. The light guide plate 12c may be formed from various materials such as epoxy resin, polycarbonate resin or glass.

The optical sheet 12d of this embodiment is formed by laminating a diffuser sheet, a first prism lens sheet and a second prism lens sheet having prisms disposed in a direction different from that of the first prism lens sheet, placed one on another in this order from the side of the light guide plate 12c. The diffuser sheet, the first prism lens sheet and the second prism lens sheet are formed in a shape that corresponds to the size and shape of the light emitting surface of the light guide plate 12c. The optical sheet 12d is not limited to this constitution, and may be formed by placing those selected from among the diffuser sheet, the prism lens sheet and polarization sheet one on another. Number of the component sheets that constitute the optical sheet and the order of placing the component sheets may be adjusted in accordance to the optical property of the backlight unit.

The light reflecting sheet 12f is preferably formed from a white PET (polyethylene terephthalate), or by coating the surface thereof with a metallic material, since high light reflectivity is required. The metal plate 12e is a member provided for the purpose of dissipating heat, generated by the light source 12a mounted on the inside, through the bottom of the resin frame 11, and is formed preferably from aluminum.

Metal Frame 13

The metal frame 13 of this embodiment has an upper plate (upper surface) and side walls (e.g. four side walls) to accommodate the resin frame 11 therein. That is, the metal frame 13 may cover the recess 11a. The upper flat surface of the metal frame 13 has an opening (window) 13a through which light from the light guiding module 12 can pass. The opening 13a is generally rectangular shape corresponding to the shape of display area of the panel display and formed large enough that the light from the light guiding module 12 can be reached to entire display area of the display panel. The remaining portion of the upper flat surface of the metal frame 13 to be left after forming opening 13a (i.e. the portion in the upper flat surface where the opening 13 is not formed) forms a peripheral flat surface of the opening 13a. Protrusions 13b through which the protrusions 11b of the resin frame 11 can pass are formed on the upper flat surface of metal 13a (i.e. periphery flat surface of the opening 13a). If the protrusion 11c is formed, the protrusion 13c through which the protrusion 11c of the resin frame 11 can pass is formed on the side wall of the metal frame 13.

The notches 13b, 13c may have any shape that accommodates the shape of the protrusions 11b, 11c. In this embodiment, the notches 13b, which are set to correspond to the protrusion 11b protruding from the upper surface of the side wall of resin frame 11, are formed only in the upper surface of metal frame 13. Since the notches 13b are not formed on the side wall of metal frame 13, the metal frame 13 has higher strength against twisting around diagonal advantageously. As shown in the FIGS. 1(a) and 1(b) the notches 13b are hole disposed on the upper surface of the metal 13. As used herein, the term "notch" includes any hole in which the protrusion can pass through. In the embodiment shown in FIGS. 1(a) and 1(b), the notch 13c, which is set to correspond to the protrusion 11c, is formed by cutting the side wall of metal frame 13. By forming the notch 13c in the side wall of metal frame 13, the protrusion 11c protruding outwardly from the outer surface of the side wall as well as protruding upwardly from the upper surface of the side wall of the resin frame 11 can pass through the notch 13. The protrude 11c can be located in the outside of outer surface of the side wall of metal frame 13, thereby the size of metal frame 13 can be reduced even if same size display panel is disposed on the metal frame 13. In a preferred embodiment, the notch 13c also may be formed in a similar manner to the notch 13b, i.e. the notch 13c formed only in the upper surface of metal frame 13 extending along the direction of the y axis in FIG. 1(b).

The metal frame 13 may be formed from a stainless steel that has high corrosion resistance. In the case of this embodiment where a plurality of light sources 12a that generate heat are mounted, in particular, it is preferable to use a ferrite-based stainless steel that has high heat conductivity. In this embodiment, a metal frame 13 formed from JIS (Japanese Industrial Standards):SUS430 with a thickness of 0.3 mm is used.

The metal frame 13 and the resin frame 11 have shapes that can fit with each other. In this embodiment, the recess 11d may be provided in the side walls of the resin frame 11, and the protrusion 13d may be provided on the side walls of the metal frame 13 to fit with the recess 11d for fastening as shown in FIG. 1(b). The structure having the protrusion formed from a metal that has resilience is fitted in the recess 11d of resin such as that described above is less prone to wear of the protrusion, and is therefore more advantageous than the structure of fitting a protrusion formed from a resin into a recess of metal. There are no restrictions on the number and shape of the recesses 11d and the protrusions 13d, as long as fitting of these members is prevented from becoming loose.

Second Embodiment

Figure 2:
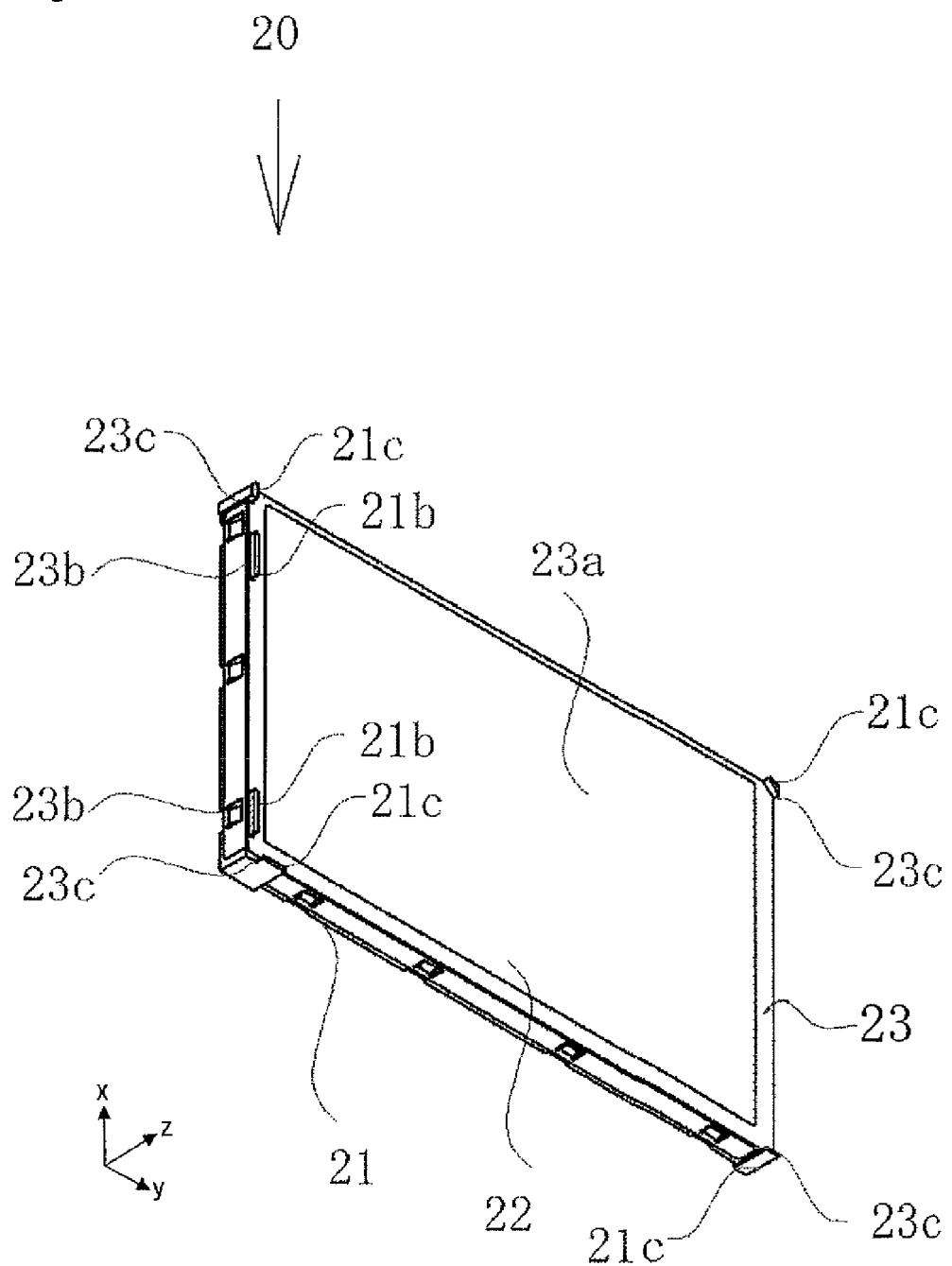
FIG. 2 is a schematic perspective view of the backlight unit according to another embodiment of the present invention.

FIG. 2 shows a backlight unit 20 according to the second embodiment of the invention. The backlight unit 20 has substantially the same constitution as the first embodiment, except that four protrusions 21c are provided and four notches 23c are disposed on a metal frame 23 so as to oppose the protrusions 21c as shown in FIG. 2. Each of the four protrusions 21c is adjacent to a different corner of a resin frame 21. That is, each corner of the resin 21 in the second embodiment has a protrusion 21c which are adjacent to the corner (i.e. a protrusion 21c disposed on the corner or nearby the corner) and protrudes from a top surface of the resin frame 21. In this arrangement of the four protrusions 21c where the four protrusions 21c are adjacent to different corners, the distance between the protrusions 21c are increased compared with the case where the four protrusions 21c are not adjacent to the corners (e.g. four protrusions 21c are disposed on the middle portions of side walls of the resin frame 12). In the preferred embodiment of backlight unit 20, each of the four protrusions 21c has a portion which is disposed outside of an extension of the shorter edge of the opening 23a of the upper surface of a metal frame 23 (extension of edge of opening 23a in x direction in FIG. 2) as shown in FIG. 2, so that the four protrusion 21c are certainly adjacent to each of the four corners of resin frame 23. This also means that each of the four notches 23 has a portion which is disposed outside of an extension of the shorter edge of the opening 23a. The four protrusions 21c of the backlight unit 20 result in the higher accuracy of the positioning of a display panel disposed on the backlight unit 20 because the number of the protrusions 21c is increased to four and the protrusion 21c of the backlight unit 20 have enough distance therebetween to obtain the higher accuracy.

At least one (preferably two or more) of the four protrusions 21c extends in the direction of longer side of the recess 22 (i.e. in the direction of y axis in FIG. 2), thereby the position of a display panel in the x axis direction of FIG. 2 is defined. The rest of the four protrusions 21c may extend in different directions, such as in the x axis direction in FIG. 2. The protrusions 21c preferably protrude outwardly from the outer surface of the side wall of resin frame 21, similar as the protrusion 11c in the backlight unit 10 according to the first embodiment of the invention. When the protrusions 21c protrude outwardly as mentioned, the notches 23c are formed by cutting side walls of a metal frame 23, similar as the notch 13c of the backlight unit 10, thereby the protrusions 21c can pass through the notches 23c and protrude upwardly from the upper surface of the metal frame 23. In this preferred embodiment the notched 13c are formed in the portion of side wall of metal frame 23 adjacent to different corners of metal frame 23 because the protrusions 21c are adjacent to different corners of resin frame 21. This constitution makes it possible to maintain higher strength to endure extraneous force acting on the metal frame 23 compared with the case where the notches 13 are formed in the middle portions of side walls of the metal frame 23.

Third Embodiment

Figure 3:
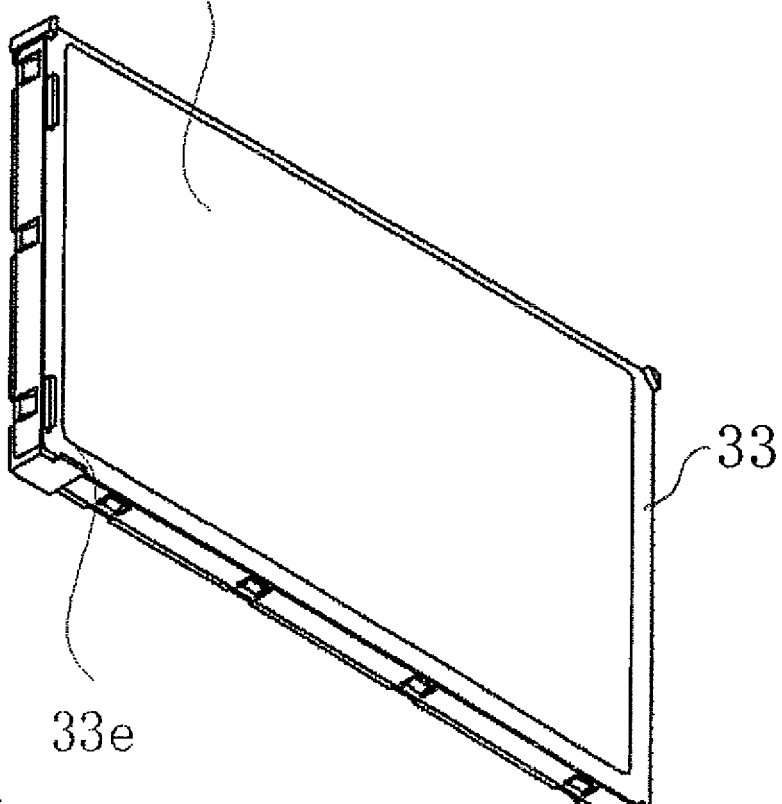
FIG. 3 is a schematic perspective view of the backlight unit according to still another embodiment of the present invention.

FIG. 3 shows a backlight unit 30 according to the third embodiment of the invention. The backlight unit 30 has substantially the same constitution as the second embodiment, except that an opening 33a has rounded corners 33e of radius of curvature in a range from 0.3 to 2.3 mm, as shown in FIG. 3. By rounding of the corners of the opening 33a, it is made possible to increase the strength of the metal frame 33 while maintaining the aperture area of the opening 33a required passing the light from a light guiding module. The rounding corners 33e may applied to only one or some of corners of the opening 33e. However in a preferred embodiment all corners (i.e. four corners) of the opening 33a are the rounding corners 33a. The rounding corners 33e may be applied to the corners of the opening 13a according to the first embodiment.

The present invention is applicable to an onboard liquid crystal display apparatus and the like as a backlight unit that is resistant to vibration, low in profile, compact and consumes less power.

This application is based upon and claims the benefit of priority from the prior Japanese Patent Applications No. 2008-30092 under the Paris Convention, and, thus, the entire contents thereof are incorporated herein by reference.

What is claimed is:

1. A backlight unit comprising:
    a light guiding module having a light source and a light guide plate;
    a resin frame having a recess formed by side walls and bottom surface thereof, and housing the light guiding module; and
    a metal frame fitted with the resin frame, having an opening in an upper surface thereof, and the opening being located above the recess of the resin frame and allowing to pass light from the light guiding module therethrough,
    wherein the resin frame has rectangular shape in planar view and has a protrusion, said same protrusion of the resin frame being located on a corner or adjacent to a corner of the rectangular shape thereof, and said same protrusion protrudes both
        a) outwardly from an outer surface of a side wall of the resin frame, said same protrusion thereby forming an outwardly protruding portion, and
        b) upwardly from said outwardly protruding portion, thereby reaching over a top surface of the resin frame,
    the metal frame having a notch formed by cutting a side wall thereof on the upper surface thereof so that said same protrusion passes therethrough, and the opening allows the light from the light guiding module to pass therethrough, wherein the notch of the metal frame extends through the entire height of the side wall of the metal frame, said height of the side wall being along the thickness of the metal frame.

2. The backlight unit according to claim 1, wherein the opening has a substantially rectangular shape, and said same protrusion has a portion disposed outside of an extension of a shorter edge of the opening of the upper surface of the metal frame.

3. The backlight unit according to claim 1, wherein the opening has corners rounded so that radius of curvature thereof is in a range from 0.3 to 2.3 mm.

4. The backlight unit according to claim 2, wherein the opening has corners rounded so that radius of curvature thereof is in a range from 0.3 to 2.3 mm.

* * * * *